(12) United States Patent
Choi

(10) Patent No.: US 12,499,888 B2
(45) Date of Patent: Dec. 16, 2025

(54) VEHICLE AND CONTROL METHOD THEREOF

(71) Applicants: Hyundai Motor Company, Seoul (KR); Kia Corporation, Seoul (KR)

(72) Inventor: Seohwan Choi, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 435 days.

(21) Appl. No.: 18/072,403

(22) Filed: Nov. 30, 2022

(65) Prior Publication Data
US 2023/0260511 A1   Aug. 17, 2023

(30) Foreign Application Priority Data

Feb. 14, 2022   (KR) ......................... 10-2022-0019084

(51) Int. Cl.
*G10L 15/22*   (2006.01)
*B60R 16/037*   (2006.01)
(Continued)

(52) U.S. Cl.
CPC .......... *G10L 15/22* (2013.01); *B60R 16/0373* (2013.01); *G06F 3/167* (2013.01);
(Continued)

(58) Field of Classification Search
CPC ......... G10L 15/08; G10L 15/22; G10L 15/30; G10L 15/063; G10L 2015/228; G10L 2015/223; G10L 15/26; G10L 2015/081; G10L 15/04; G10L 15/32; G10L 2015/088; G10L 15/02; G10L 15/10; G10L 15/1815; G10L 15/20; G10L 15/28; G10L 2015/227; G10L 25/48; G10L 13/033; G10L 15/00; G10L 15/05; G10L 17/00; G10L 17/02; G10L 2015/0631; G10L 2015/0635; G10L 2015/221; G10L 2025/783; G10L 25/30; G10L 25/51; G10L 25/78; G10L 13/02;
(Continued)

(56) References Cited

U.S. PATENT DOCUMENTS 9,484,025 B2 * 11/2016 Toopran ................ G10L 15/193
10,037,758 B2 * 7/2018 Jing ........................ G10L 15/22
(Continued)

FOREIGN PATENT DOCUMENTS

EP   2864982 A1 *  4/2015  ............. G10L 15/08

*Primary Examiner* — Abdelali Serrou
(74) *Attorney, Agent, or Firm* — Morgan Lewis & Bockius LLP

(57) ABSTRACT

A vehicle and a control method thereof includes a microphone to which a speech command of a user is input; a communication module configured to receive contact data and contact history data from a mobile device; at least one memory configured to store a first speech recognition database, obtained based on the contact history data received from the mobile device, and a second speech recognition database obtained based on the contact data received from the mobile device; and at least one processor configured to, when a speech command for calling or texting is input to the microphone, determine a final recipient or generate a recipient candidate list, based on recipient information included in the speech command, the stored first speech recognition database, and the stored second speech recognition database.

18 Claims, 13 Drawing Sheets

(51) Int. Cl.
*G06F 3/16* (2006.01)
*G06F 16/635* (2019.01)
*G10L 15/08* (2006.01)
*G10L 15/30* (2013.01)
*H04M 1/27* (2006.01)

(52) U.S. Cl.
CPC ............ *G06F 16/635* (2019.01); *G10L 15/08* (2013.01); *G10L 15/30* (2013.01); *H04M 1/271* (2013.01); *G10L 2015/081* (2013.01); *G10L 2015/223* (2013.01)

(58) Field of Classification Search
CPC ..... G10L 15/285; G06F 3/167; G06F 16/635; G06F 3/16; G06F 40/295; G06F 3/048
See application file for complete search history.

(56) References Cited

U.S. PATENT DOCUMENTS

| | | | |
|---|---|---|---|
| 11,127,398 B2* | 9/2021 | Xu | G06F 3/167 |
| 11,314,898 B2* | 4/2022 | Rhee | G06F 3/04883 |
| 2011/0015928 A1* | 1/2011 | Odell | G10L 15/30 |
| | | | 704/275 |
| 2020/0349943 A1* | 11/2020 | Elangovan | G10L 15/063 |
| 2021/0157834 A1* | 5/2021 | Sivasubramanian | |
| | | | G06F 16/686 |
| 2021/0319782 A1* | 10/2021 | Gong | G06F 3/167 |

* cited by examiner

FIG. 9
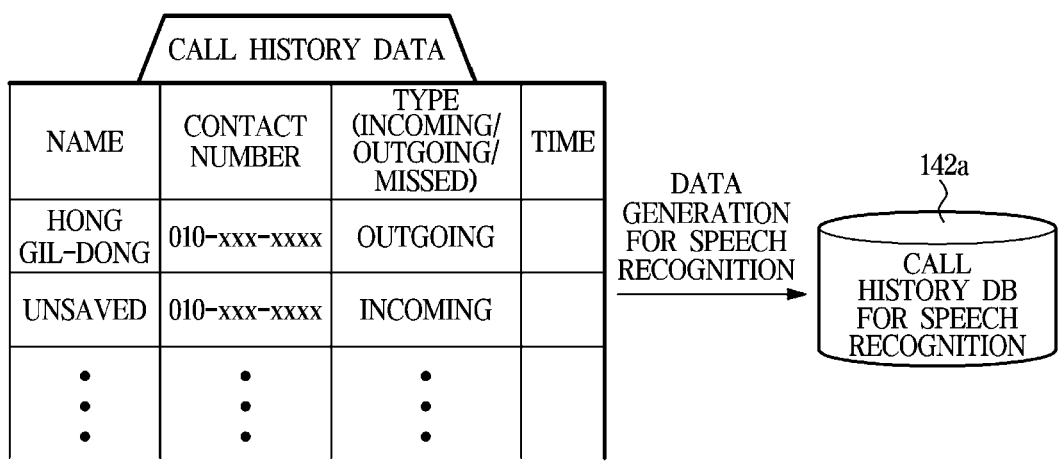
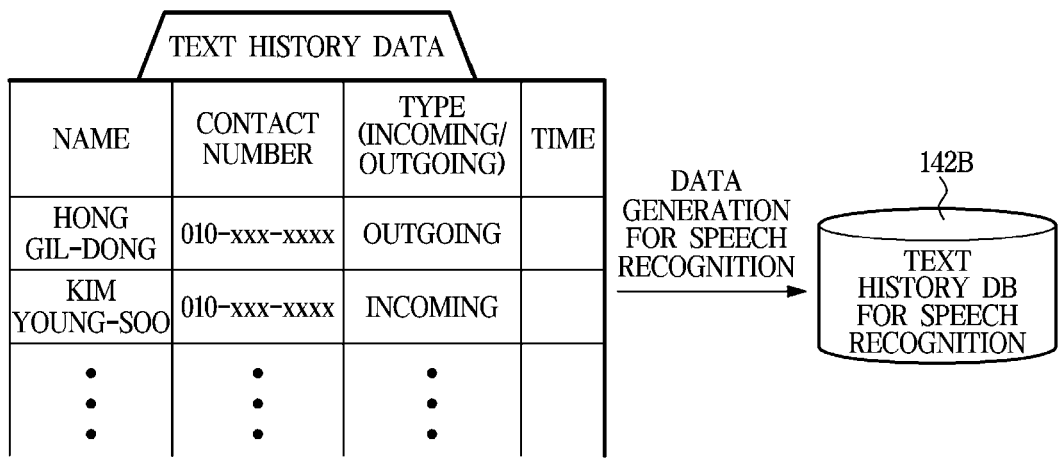

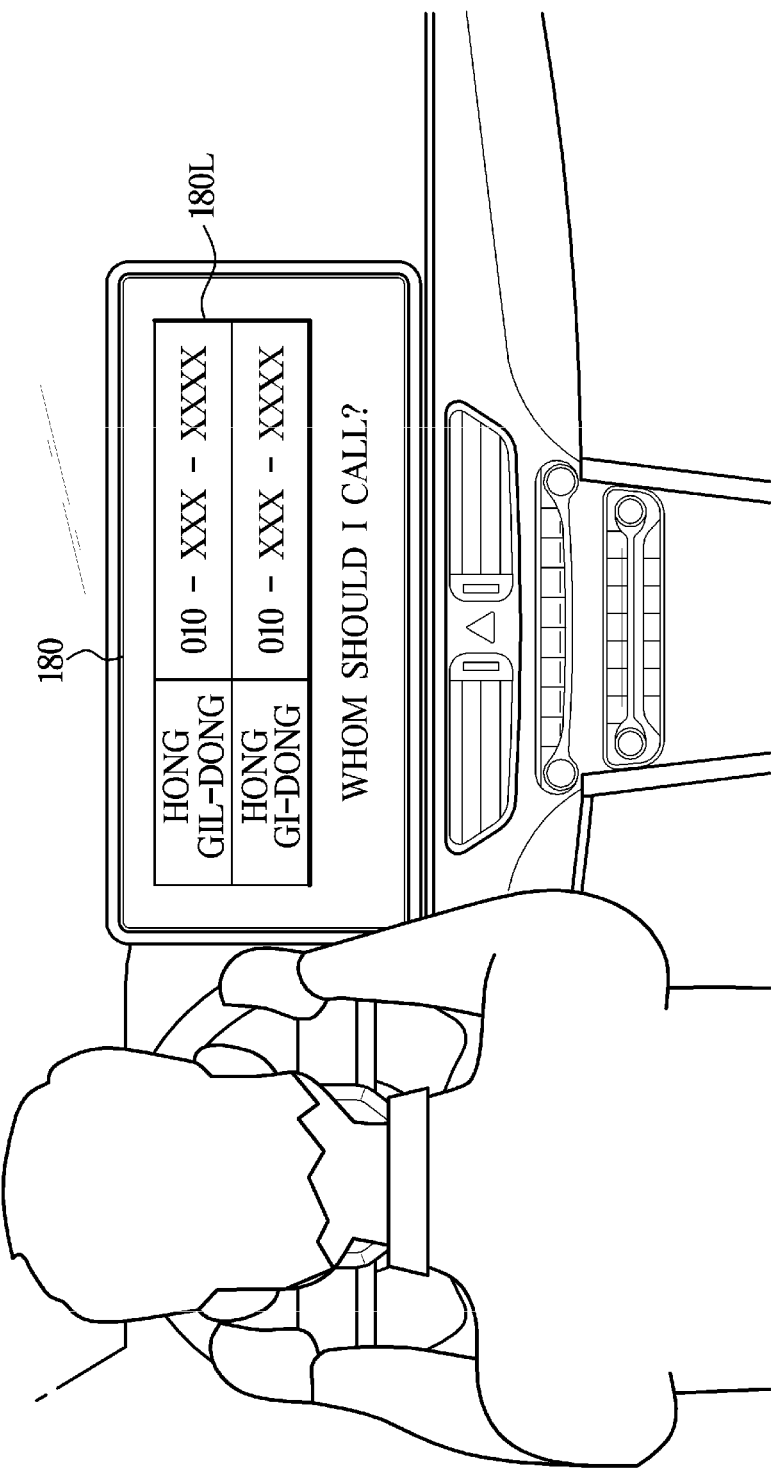

VEHICLE AND CONTROL METHOD THEREOF

CROSS-REFERENCE TO RELATED APPLICATION

The present application claims priority to Korean Patent Application No. 10-2022-0019084, filed on Feb. 14, 2022, the entire contents of which is incorporated herein for all purposes by this reference.

BACKGROUND OF THE PRESENT DISCLOSURE

Field of the Present Disclosure

The present disclosure relates to a vehicle which may make a call through a user's speech command and a control method thereof.

Description of Related Art

A speech recognition system is capable of identifying what is intended by a user from a user's speech and providing a service corresponding to the identified user intention.

A speech recognition system is linked to a specific device to control the device and provide specific information according to a user intention.

Recently, because a speech recognition system is provided in a vehicle, a user may control the vehicle, obtain desired information or be provided with desired services simply by user's utterance or through dialogues with the vehicle.

Among the functions performable in a vehicle according to a user's speech command, a function of making a call or sending a text message to a specific party exists. However, when a user's speech is misrecognized or similar names are stored in a contact list, calling or texting an unintended recipient may be performed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle and a control method thereof which may specify a recipient of a call or text through speech recognition on a user's speech by considering call history data, text history data as well as contact data, preventing calling or texting an unintended recipient.

Additional aspects of the present disclosure will be set forth in part in the description which follows, and in part, will be obvious from the description, or may be learned by practice of the present disclosure.

According to an aspect of the present disclosure, there is provided a vehicle including: a microphone to which a speech command of a user is input; a communication module configured to receive contact data and contact history data from a mobile device; at least one memory configured to store a first speech recognition database, obtained based on the contact history data received from the mobile device, and a second speech recognition database obtained based on the contact data received from the mobile device; and at least one processor configured to, when a speech command for calling or texting is input to the microphone, determine a final recipient or generate a recipient candidate list, based on recipient information included in the speech command, the stored first speech recognition database, and the stored second speech recognition database.

The at least one processor is configured to perform a first search of searching the first speech recognition database for data corresponding to the recipient information included in the speech command, and perform a second search of searching the second speech recognition database for data corresponding to the recipient information included in the speech command.

In the above paragraphs, the at least one processor is configured to determine the final recipient or generate the recipient candidate list, based on a result of the first search and a result of the second search.

In the above paragraphs, when a single piece of data included in a result of the first search and a result of the second search exists, the at least one processor is configured to determine the single piece of data as the final recipient.

In the above paragraphs, when two or more pieces of data included in the result of the first search and the result of the second search exist, the at least one processor is configured to generate the recipient candidate list including the two or more pieces of data.

In the above paragraphs, when data included in the result of the first search and the result of the second search does not exist, the at least one processor is configured to generate the recipient candidate list including the result of the first search and the result of the second search.

In the above paragraphs, the at least one processor is configured to limit an object of the first search to data recorded within a predetermined time period from a current point in time in the first speech recognition database.

In the above paragraphs, the at least one processor is configured to obtain additional information related to a contact time from the speech command of the user, and perform the first search based on the obtained additional information.

In the above paragraphs, the at least one processor is configured to call or text the determined final recipient.

In the above paragraphs, the vehicle further includes a display; and a speaker, wherein the at least one processor is configured to output the generated recipient candidate list through the display or the speaker.

According to an aspect of the present disclosure, there is provided a method of controlling a vehicle, the control method including: receiving contact data and contact history data from a mobile device; generating and storing a first speech recognition database based on the contact history data received from the mobile device; generating and storing a second speech recognition database based on the contact data received from the mobile device; and when a speech command for calling or texting is input to a microphone, determining a final recipient or generating a recipient candidate list, based on recipient information included in the speech command, the stored first speech recognition database and the stored second speech recognition database.

The determining of the final recipient or the generating of the recipient candidate list includes performing a first search of searching the first speech recognition database for data corresponding to the recipient information included in the speech command, and performing a second search of searching the second speech recognition database for data corresponding to the recipient information included in the speech command.

In the above paragraphs, the determining of the final recipient or the generating of the recipient candidate list includes determining the final recipient or generating the recipient candidate list, based on a result of the first search and a result of the second search.

In the above paragraphs, when a single piece of data included in the result of the first search and the result of the second search exists, the determining of the final recipient or the generating of the recipient candidate list includes determining the single piece of data as the final recipient.

In the above paragraphs, when two or more pieces of data included in the result of the first search and the result of the second search exist, the determining of the final recipient or the generating of the recipient candidate list includes generating the recipient candidate list including the two or more pieces of data.

In the above paragraphs, when data included in the result of the first search and the result of the second search does not exist, the determining of the final recipient or the generating of the recipient candidate list includes generating the recipient candidate list including the result of the first search and the result of the second search.

In the above paragraphs, an object of the first search is limited to data recorded within a predetermined time period from a current point in time in the first speech recognition database.

In the above paragraphs, the determining of the final recipient or the generating of the recipient candidate list includes obtaining additional information related to a contact time from the speech command of a user, and performing the first search based on the obtained additional information.

In the above paragraphs, the control method further includes calling or texting the determined final recipient.

In the above paragraphs, the control method further includes outputting the generated recipient candidate list through a display or a speaker provided in the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 9 is a diagram illustrating operations of producing a speech recognition database using contact history data by a vehicle according to an exemplary embodiment of the present disclosure;

FIG. 14 is a diagram illustrating an example of a recipient candidate list output by the example of FIG. 13.

Figure 1:
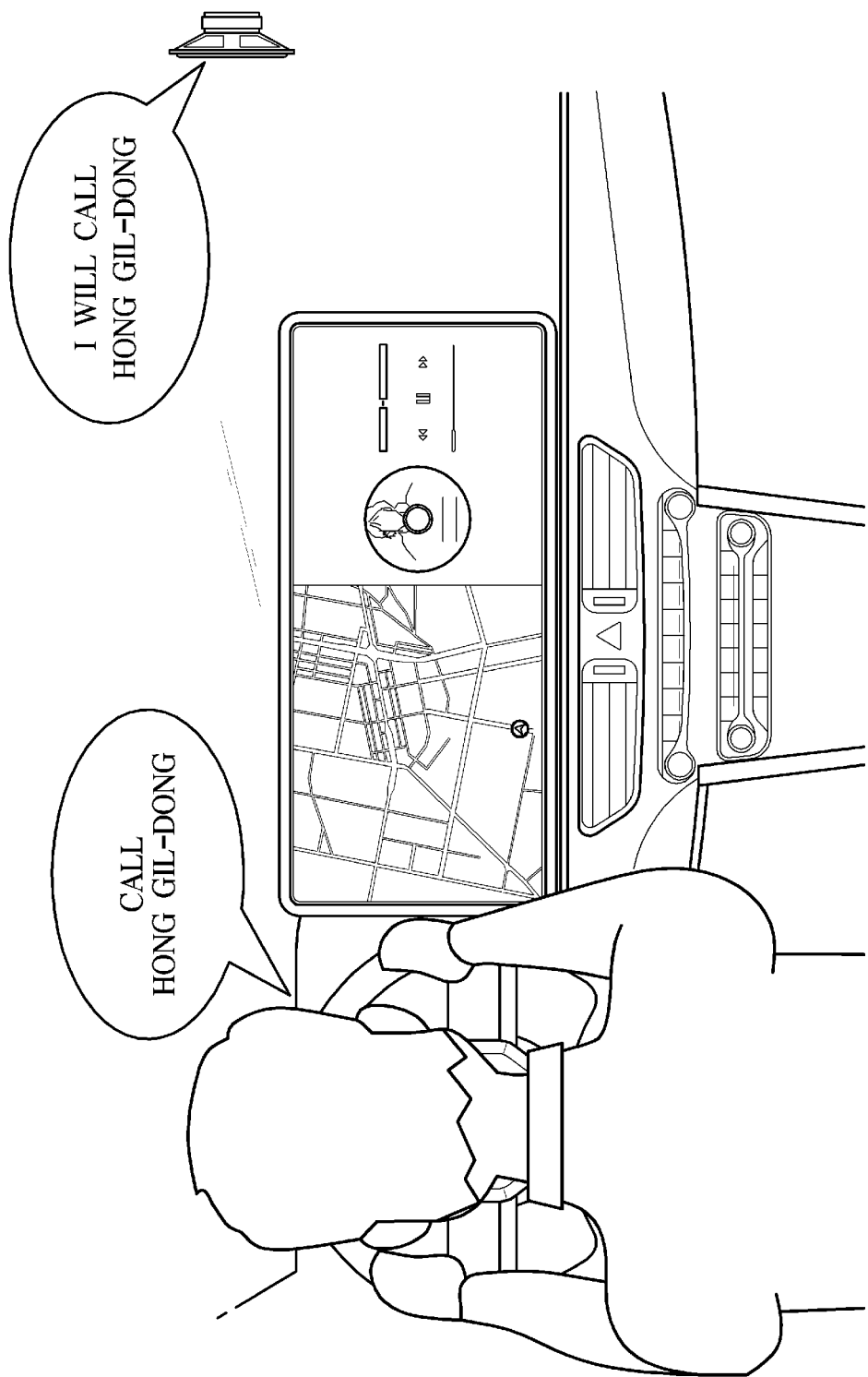
FIG. 1 and FIG. 2 are diagrams illustrating operations of recognizing a user's speech and making a call by a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The exemplary embodiments set forth herein and illustrated in the configuration of the present disclosure are only exemplary embodiments of the present disclosure, so it should be understood that they may be replaced with various equivalents and modifications at the time of the present disclosure.

Terminologies used herein are for describing various exemplary embodiments only and is not intended to limit the present disclosure. It is to be understood that the singular forms are intended to include the plural forms as well, unless the context clearly dictates otherwise. It will be further understood that the terms "include", "comprise" and/or "have" when used in the present specification, specify the presence of stated features, integers, steps, operations, elements, and/or components, but do not preclude the presence or addition of one or more other features, integers, steps, operations, elements, components, and/or groups thereof.

Furthermore, the terms such as "~part", "~device", "~block", "~member", "~module", and the like may refer to a unit of processing at least one function or act. For example, the terms may refer to at least process processed by at least one hardware, such as field-programmable gate array (FPGA)/application specific integrated circuit (ASIC), software stored in memories or processors.

It will be understood that, although the terms first, second, etc. may be used herein to describe various elements, these elements should not be limited by these terms.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it should be understood that the term "at least one of a, b, or c" may include only a, only b, only c, both a and b, both a and c, both b and c, or all of a, b and c.

Meanwhile, embodiments may be stored in a form of a recording medium storing computer-executable instructions. The instructions may be stored in a form of a program code, and when executed by a processor, the instructions may perform operations of the disclosed exemplary embodiments of the present disclosure. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Hereinafter, embodiments of a vehicle and a control method thereof are described in detail with reference to the accompanying drawings.

Figure 2:
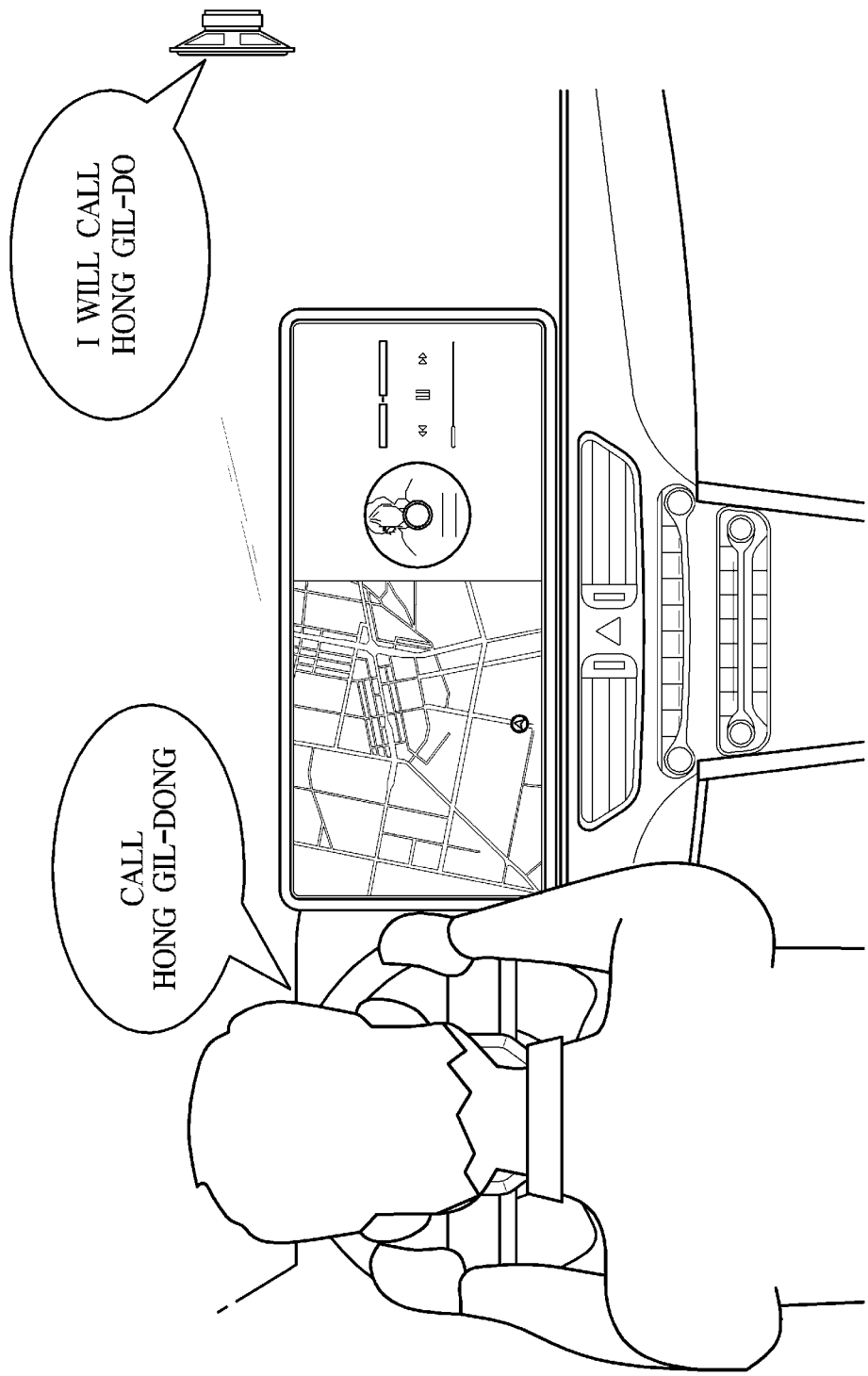

FIG. 1 and FIG. 2 are diagrams illustrating operations of recognizing a user's speech and making a call by a vehicle.

As shown in FIG. 1, a vehicle provided with a speech recognition apparatus may recognize a user's speech command of "call Hong Gil-dong" and determine 'Hong Gil-dong' as a recipient of the call.

When the recipient of the call is determined, the vehicle may output a system response like "I will call Hong Gil-dong", and may call a contact number corresponding to 'Hong Gil-dong'. Accordingly, a user may easily and safely call an intended recipient without using user's hands to press a button, etc.

However, in an in-vehicle environment, errors in speech recognition may occur due to noise included in a user's speech command. When similar names are stored in a user's contact list, such a speech recognition error may occur, leading to calling an unintended recipient.

For example, as shown in FIG. 2, even though a user said that "call Hong Gil-dong", the speech recognition apparatus of the vehicle may recognize a recipient of the call as 'Hong Gil-do' and call a contact number corresponding to 'Hong Gil-do'.

The vehicle and a control method thereof according to various exemplary embodiments of the present disclosure may specify a recipient of a call in consideration of a contact history such as a call history and a text history, to overcome such disadvantages. Hereinafter, the vehicle and the control method thereof according to an exemplary embodiment are described in detail with reference to accompanying drawings.

Figure 3:
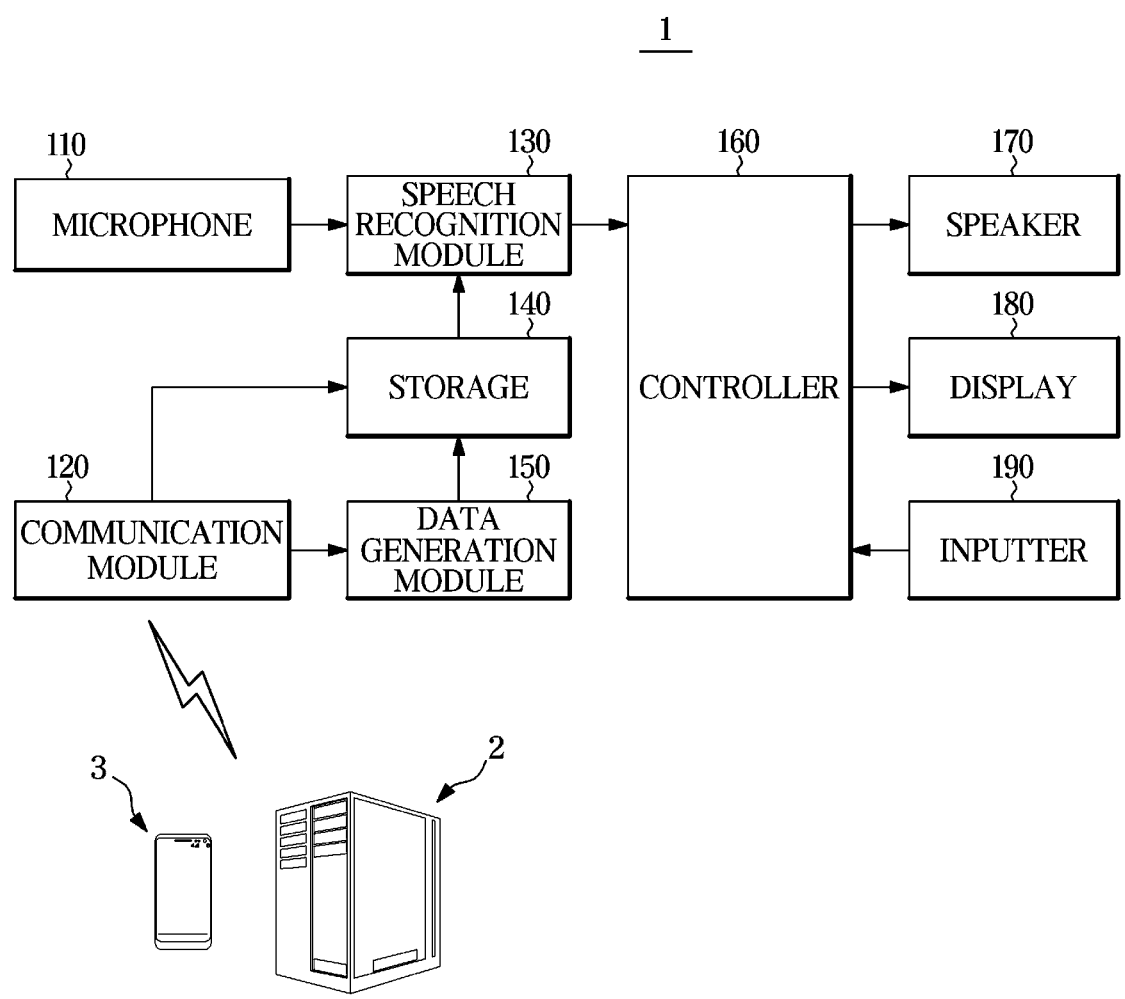
FIG. 3 is a block diagram illustrating a vehicle according to an exemplary embodiment of the present disclosure.

FIG. 3 is a block diagram illustrating a vehicle according to an exemplary embodiment of the present disclosure.

A speech recognition apparatus recognizing a user's speech may be provided in an external server connected to a vehicle through wireless communication, or be embedded in the vehicle itself. A position of the speech recognition apparatus of the vehicle is not limited, but it is described in the below-described embodiment that the speech recognition apparatus is embedded in the vehicle.

Referring to FIG. 3, a vehicle 1 according to an exemplary embodiment of the present disclosure includes a microphone 110 to which a user's speech is input, a speech recognition module 130, a communication module 120, a data generation module 150, a storage 140, a controller 160, a speaker 170, a display 180 and an inputter 190. Here, the speech recognition module 130 recognizes the user's speech input to the microphone 110, and the communication module 120 performs communication with an external device such as a server 2 or a mobile device 3. The data generation module 150 produces a speech recognition database based on data received from the mobile device 3, the storage 140 stores the produced speech recognition database, and the controller 160 is configured to control overall operations of the vehicle 1. The speaker 170, the display 180 and the inputter 190 correspond to a user interface.

Constituent components related to driving of the vehicle 1 and other constituent components such as air conditioning device, lighting device, etc., are well-known, and thus a description thereof is omitted herein. Constituent components related to various exemplary embodiments of the present disclosure and operations thereof are described in detail.

The microphone 110 may be provided inside the vehicle 1. The microphone 110 may be provided to receive a user's speech, for example, provided on a steering wheel, center fascia, headliner, rear-view mirror, sun visor, cluster, etc.

Here, a user may include a driver or an occupant. Only one microphone 110 may be provided, or two or more microphones 210 may be provided at different positions to remove noise or receive an occupant's speech.

Various audios generated around the microphone 110 may be input to the microphone 110 in addition to the user's speech. The microphone 110 may output an audio signal corresponding to the audio input to the microphone 110, and the output audio signal may be processed by the speech recognition module 130 or transmitted to the external server 2 through the communication module 120.

The vehicle 1 may also include the inputter 190 for manually receiving a user command in addition to the microphone 110. The inputter 190 may include an inputter provided as a jog shuttle or a button, in an area where an audio, video, navigation (AVN) is provided on a center fascia, in an area where a gearbox is provided, or on a steering wheel.

Also, to receive a control command related to passenger seats, the inputter 190 may include an inputter provided on each door of the vehicle 1, and an inputter provided on a front armrest or a rear armrest.

Furthermore, the inputter 190 may include a touchpad like a touchscreen provided integrally with the display 180.

The display 180 is provided inside the vehicle 1 and may visually output information required to perform a function desired by the user.

The display 180 may include an AVN display provided on a center fascia of the vehicle 1, a cluster display, or a head-up display (HUD). Alternatively, the display 180 may include a rear seat display provided on a back of the front seat's headrest so that a rear occupant may see the rear seat display. When the vehicle 1 is a multi-seater vehicle, the display 180 may include a display mounted on a headliner of the vehicle 1.

The display 180 may be provided anywhere as long as users inside the vehicle 1 may see the display 180, and the position or the number of displays 180 are not limited.

The speaker 170 is provided inside the vehicle 1, for example, provided on a door, a dashboard, a center fascia, etc., of the vehicle 1, to audibly output information required to perform a function desired by the user.

The communication module 120 may perform communication with other electronic devices such as the external server 2 or the mobile device 3 to transmit and receive information with the other devices.

For example, the communication module 120 may perform communication with the mobile device 3 located in the vehicle 1 using short-range communication technologies such as Wi-Fi, Zigbee, Bluetooth, Wi-Fi direct, Bluetooth low energy, or near field communication (NFC), and the like.

Also, the communication module 120 may transmit and receive information with the mobile device 3 through a cable connected to a USB terminal, an AUX terminal, and the like.

The mobile device 3 may include at least one of a smartphone, a personal digital assistant (PDA), a tablet PC, a laptop, or a wearable device such as a smart watch or smart glasses. In addition to the above examples, any device configured for performing a call function, storing information such as contact numbers, call history, etc., and providing information such as contact numbers, call history, etc., through communication with the vehicle 1 may be included in the mobile device 3 in the exemplary embodiment of the present disclosure.

Furthermore, the communication module 120 may perform communication with the external server 2 using various communication technologies such as 4G, 5G, Wi-Fi, and the like. The external server 2 may be a server including a search engine, a server providing multimedia content such as music or movie, or a server providing a speech recognition service.

Furthermore, the communication module 120 may download contact data and contact history data including a call history and a text history from the mobile device 3 connected to the vehicle 1. Here, the mobile device 3 connected to the vehicle 1 may refer to the mobile device 3 in a communicable state by completing Bluetooth pairing with the vehicle 1, or the mobile device 3 connected to the vehicle 1 through a cable.

The data generation module 150 may produce a speech recognition database, which may be used for speech recognition, based on the downloaded contact data and contact history data. The above process is referred to as data generation (DP), which is described in detail later.

The speech recognition database produced in the data generation module 150 may be stored in the storage 140, and be used when the speech recognition module 130 recognizes a speech input to the microphone 110.

The storage 140 may include at least one of a main memory device or an auxiliary memory device. The main memory device may be implemented using a semiconductor storage medium such as a read only memory (ROM) and/or random access memory (RAM). For example, the ROM may include an erasable programmable read only memory (EPROM), an electrically erasable programmable read only memory (EEPROM), and/or a mask-ROM, etc. The RAM, for example, may include a static random access memory (S-RAM) and/or dynamic random access memory (D-RAM), etc.

The auxiliary memory device may be implemented using at least one storage medium such as a flash memory device, secure digital (SD card), solid state drive (SDD), Hard Disk Drive (HDD), magnetic drum, compact disc, laser disc, magnetic tape, magneto-optical disk, and/or floppy disk, and the like.

The controller 160 may control overall operations of the vehicle 1. For example, the controller 160 may be included in a head unit of the vehicle 1, process a user input input through the inputter 190, and perform a control corresponding to the user input. Also, the controller 160 may control the speaker 170 or the display 180 to audibly or visually output required information while performing the control.

Furthermore, when a user's speech command for calling or texting is input, the controller 160 may determine a final recipient or generate a recipient candidate list according to the below-described operations.

The speech recognition module 130, the data generation module 150 and the controller 160 may include at least one recording medium storing a program performing the aforementioned operations or operations to be described later and at least one processor implementing a stored program.

The at least one recording medium storing a program is a computer-readable medium and may include various types of hardware devices configured for storing a specific program executed in response to a call from a computer, etc., such as a magnetic disk storage medium such as a hard disk or a floppy disk, a magnetic tape, an optical media such as a compact disc (CD) or a digital versatile disc (DVD), magneto-optical media such as a floptical disk, a semiconductor storage medium such as a read only memory (ROM), random access memory (RAM), or flash memory, and the like.

Meanwhile, the above-described constituent components of the vehicle 1 are divided based on their function, and are not necessarily physically separated from each other. For example, at least one of the data generation module 150, the speech recognition module 130 or the controller 160 may share a recording medium or a processor. Here, the recording medium may include at least one memory shared with the storage 140.

Figure 4:
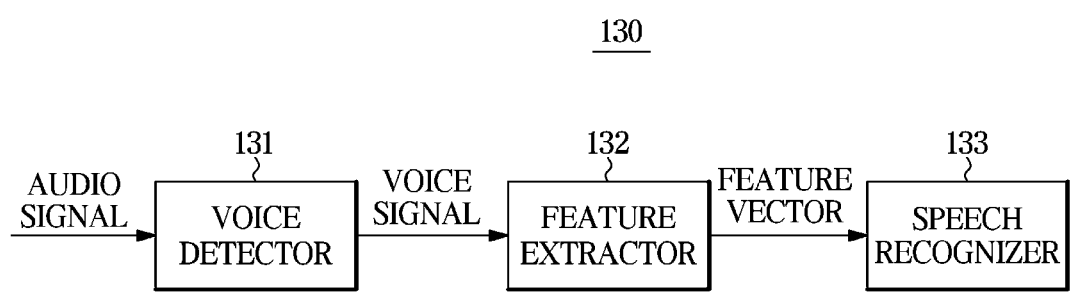
FIG. 4 is a block diagram illustrating operations of a speech recognition module included in a vehicle according to an exemplary embodiment of the present disclosure.

FIG. 4 is a block diagram illustrating operations of a speech recognition module included in a vehicle according to an exemplary embodiment of the present disclosure.

Referring to FIG. 4, the speech recognition module 130 may include a voice detector 131, a feature extractor 132 and a speech recognizer 133.

An audio signal received from the microphone 110 includes a voice part representing a user's speech, and a non-voice part. The voice detector 131 may detect the voice part from the audio signal received from the microphone 110, facilitating the speech recognition module 130 to perform speech recognition on the voice part only.

The feature extractor 132 may extract a feature vector from a voice signal. For example, the feature extractor 132 may extract a feature vector from a voice signal using feature vector extraction techniques such as a linear predictive coefficient (LPC), Cepstrum, a Mel frequency cepstral coefficient (MFCC), a filter bank energy, or the like.

The speech recognizer 133 may compare the extracted feature vector with a pre-defined pattern, and determine whether to match based on a similarity between the feature vector and the pre-defined pattern. An acoustic model may be used to compare the feature vector and the pre-defined pattern, and the pre-defined pattern may be stored in a speech recognition database to be described later.

The speech recognition database may be generated for contact data, contact history data, pre-defined commands, and frequently used words received from the mobile device 3.

The speech recognizer 133 may compare the feature vector with the pre-defined pattern, by use of a dynamic time warping (DTW), hidden Markov models, vector quantization (VQ), or an artificial neural network (ANN), or the like.

In the exemplary embodiment of the present disclosure, when a user inputs a speech command for calling or texting to the microphone 110, the speech recognition module 130 recognizes the speech command, identifying that a function desired by the user is making a call or sending a text, and determining a recipient of the call or text. When determining the recipient, the contact data and the contact history data downloaded from the mobile device 3 may be used together, which is described in detail later.

Figure 5:
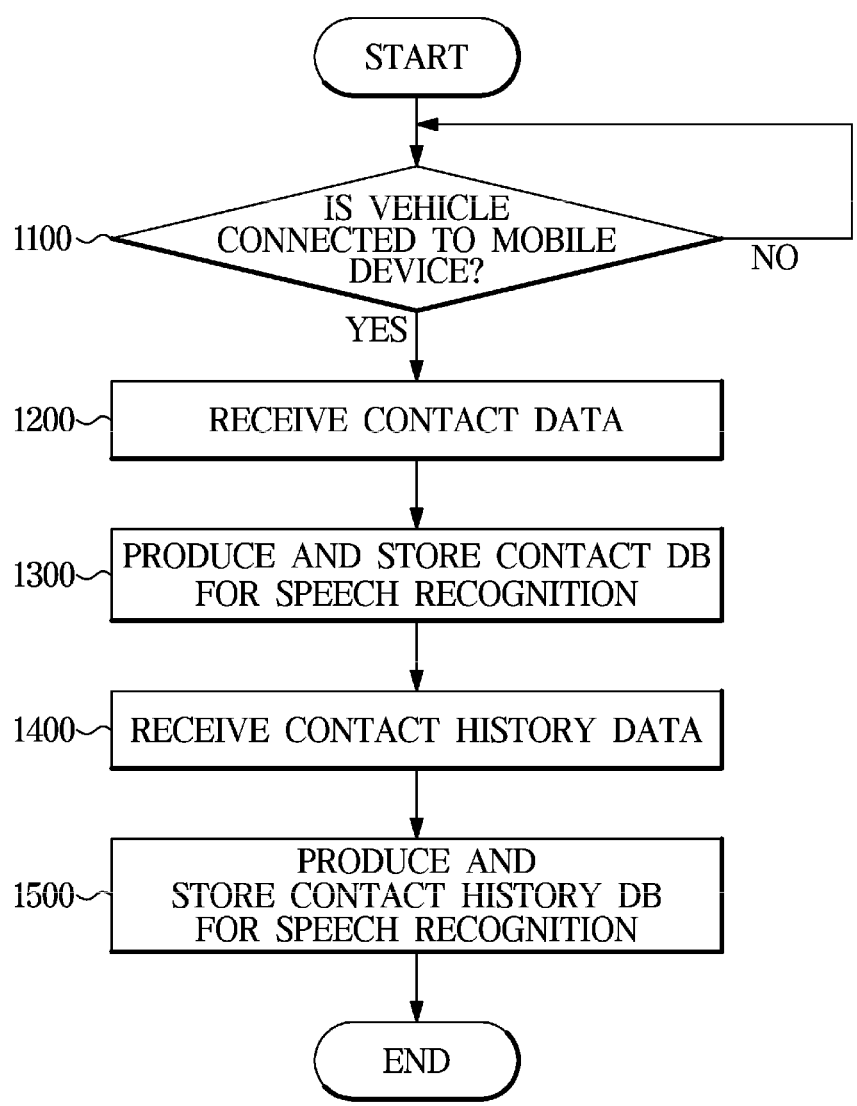
FIG. 5 is a flowchart illustrating operations of receiving data from a mobile device and producing a speech recognition database, in a method of controlling a vehicle according to an exemplary embodiment of the present disclosure.
Figure 6:
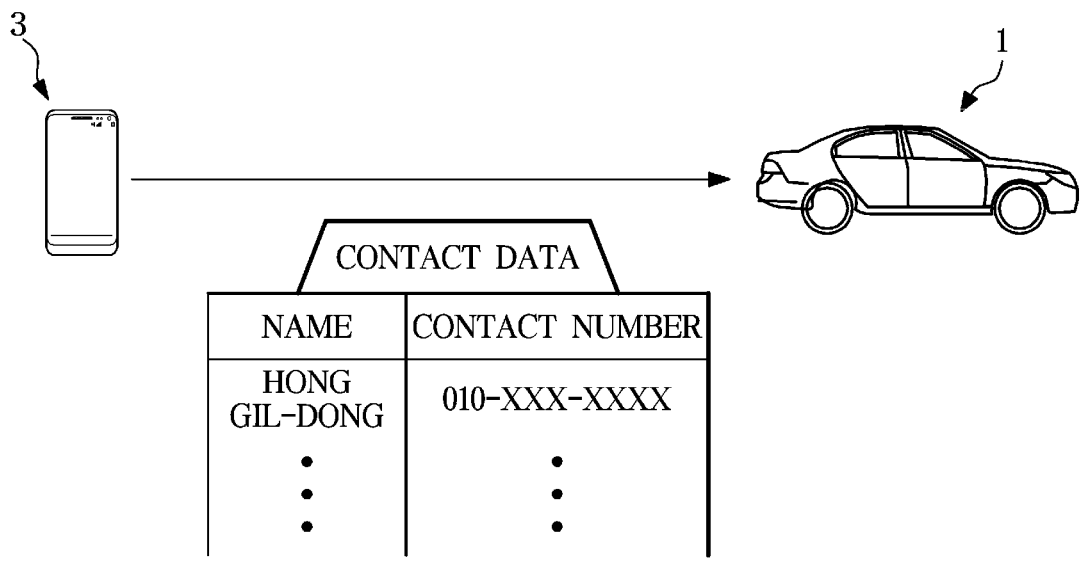
FIG. 6 is a diagram illustrating operations of receiving contact data from a mobile device by a vehicle according to an exemplary embodiment of the present disclosure.
Figure 7:
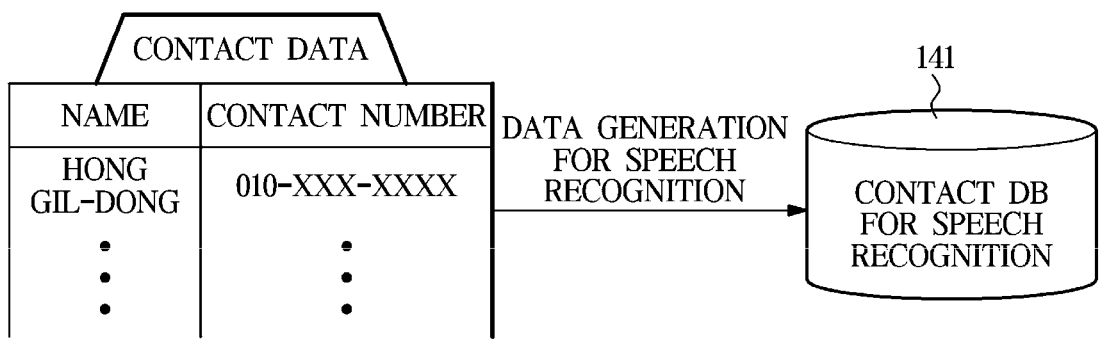
FIG. 7 is a diagram illustrating operations of producing a speech recognition database using contact data by a vehicle according to an exemplary embodiment of the present disclosure.
Figure 8:
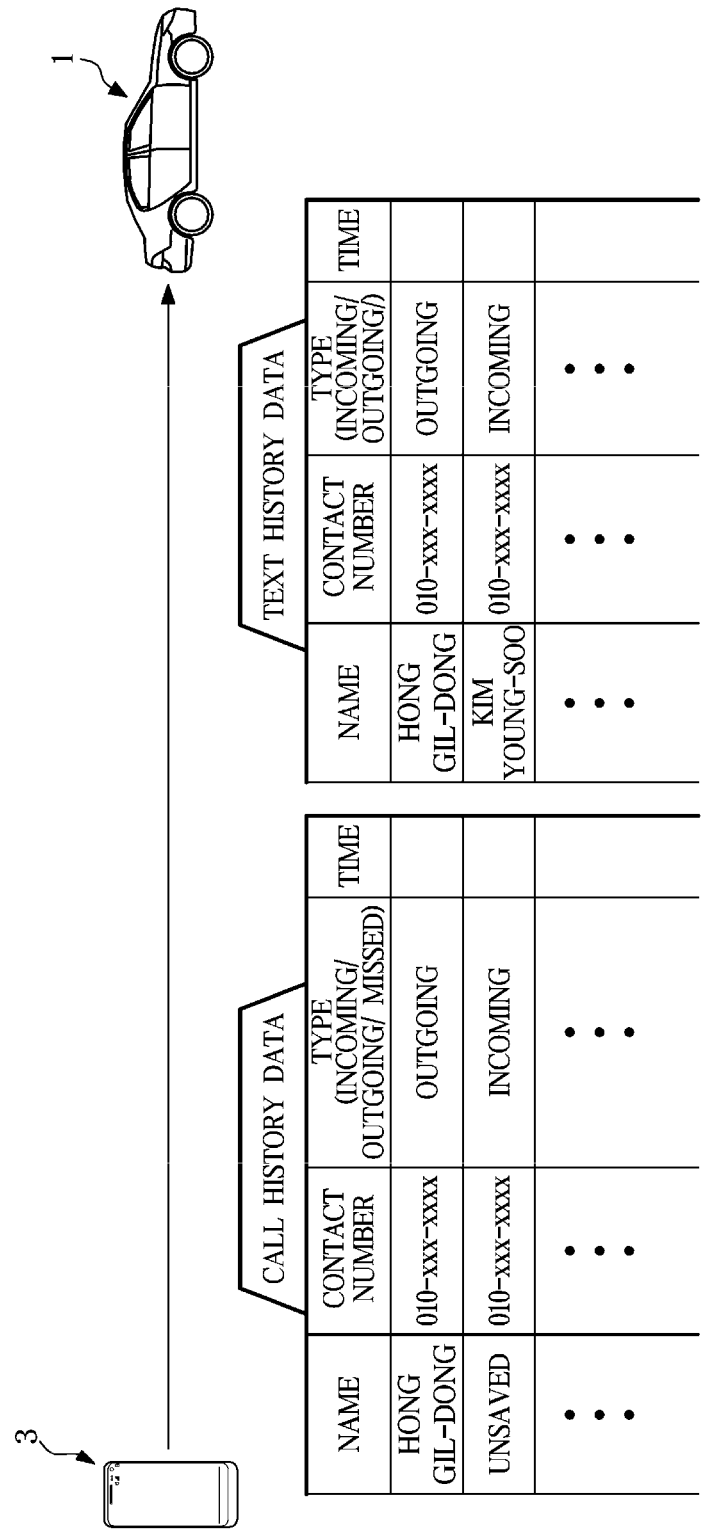
FIG. 8 is a diagram illustrating operations of receiving contact history data from a mobile device by a vehicle according to an exemplary embodiment of the present disclosure.

FIG. 5 is a flowchart illustrating operations of receiving data from a mobile device and producing a speech recognition database, in a method of controlling a vehicle according to an exemplary embodiment of the present disclosure. FIG. 6 is a diagram illustrating operations of receiving contact data from a mobile device by a vehicle according to an exemplary embodiment of the present disclosure. FIG. 7 is a diagram illustrating operations of producing a speech recognition database using contact data by a vehicle according to an exemplary embodiment of the present disclosure. FIG. 8 is a diagram illustrating operations of receiving contact history data from a mobile device by a vehicle according to an exemplary embodiment of the present disclosure. FIG. 9 is a diagram illustrating operations of producing a speech recognition database using contact history data by a vehicle according to an exemplary embodiment of the present disclosure.

The vehicle 1 according to an exemplary embodiment of the present disclosure is controlled by a method of controlling a vehicle according to an exemplary embodiment of the present disclosure. Therefore, the method of controlling a vehicle according to various exemplary embodiments of the present disclosure may be performed by the vehicle 1, and a description on the vehicle 1 is applicable to the method of controlling a vehicle, even when not specifically described below. By contrast, a description on the method of controlling a vehicle may also be applied to the vehicle 1, even when not specifically described below.

Referring to FIG. 5, the vehicle 1 confirms whether the vehicle 1 is connected to the mobile device 3 (1100). A connection between the vehicle 1 and the mobile device 3 may be made wirelessly using a Bluetooth communication or by wire using a cable.

When the vehicle 1 is connected to the mobile device 3 (Yes in operation 1100), the communication module 120 receives contact data from the mobile device 3 (1200).

In the present instance, a process for obtaining a user's consent may be executed. For example, a message may be output to inquire about whether to receive contact data from the mobile device 3 through the display 180 or the speaker 170, and when a response for approval is input from the user, the contact data may be received from the mobile device 3. Alternatively, the above processes may be executed in the mobile device 3.

Referring to FIG. 5 and FIG. 6 together, the contact data may include a name field and a contact field assigned to a corresponding name. Data in the name field may include an identifier for identifying who a contact number belongs to, such as a first name, last name, business name, title, and the like. Data in the contact field may include a contact number such as a phone number, etc.

The data generation module 150 produces and stores a contact database for speech recognition using the received contact data (1300).

When the communication module 120 receives the contact data, as shown in FIG. 7, the data generation module 150 may produce a contact database for speech recognition 141 through a data generation (DP) process.

For example, the data generation module 150 may generate a pronunciation string (pronunciation/pronunciation sequence) corresponding to a character string of the received contact data, by use of a grapheme to phoneme (G2P) technology. The data generation module 150 may generate a pronunciation string corresponding to the data in the name field of the contact data. Also, the generated pronunciation string may be stored in a tree structure to generate a vocabulary tree. The generated pronunciation string or the generated vocabulary tree may be stored in the storage 140.

Furthermore, a pronunciation string corresponding to a command may be stored in the storage 140. For example, a pronunciation string corresponding to a command related to a function of making a call, finding a route, playing radio, playing music, etc., may be stored.

Furthermore, a pronunciation string of each word required to perform a function controllable by a user through a speech command may also be stored in the storage 140. For example, pronunciation strings of words, such as a word for specifying a date, a word for specifying a time, a word for specifying a location, a word indicating a number, etc., may be stored in the storage 140.

The communication module 120 may receive contact history data from the mobile device 3 (1400). Similarly to when receiving the contact data, the contact history data may be downloaded to the vehicle 1 after obtaining a user's consent.

Referring to FIGS. 5 and 8, the contact history data may include call history data and text history data.

The call history data may include a name field, a contact field assigned to a corresponding name, a call type field (incoming/outgoing/missed), and a call time field (date and time). The contact time may include information related to a date and time at which a call was performed.

The text history data may include a name field, a contact field assigned to a corresponding name, a text type field (incoming/outgoing/missed), and a text time field (date and time). The text time may include information related to a date and time when a text message is received or transmitted.

The contact history data received from the mobile device 3 may be data for a predetermined time period. For example, contact history data recorded within a predetermined time period from a current point in time may be received from the mobile device 3. Also, a period range of the contact history data received from the mobile device 3 may be set or changed by a user.

The data generation module 150 produces and stores a contact history database for speech recognition using the received contact history data (1500).

When the contact history data is received by the communication module 120, as shown in FIG. 9, the data generation module 150 may produce the contact history database for speech recognition (142: 142a and 142b) through a DP process.

For example, the data generation module 150 may generate a pronunciation string corresponding to a character string of the received contact history data, by use of a G2P technology. The data generation module 150 may generate a pronunciation string corresponding to data in a name field of the call history data, and store the call history database for speech recognition 142a, which is a set of the generated pronunciation strings, in the storage 140. Also, the generated pronunciation string may be stored in a tree structure to generate a vocabulary tree.

Also, the data generation module 150 may generate a pronunciation string corresponding to a data in a name field of the text history data, and store the text history database for speech recognition 142b, which is a set of the generated pronunciation strings, in the storage 140. Also, the generated pronunciation string may be stored in a tree structure to generate a vocabulary tree.

The contact history databases for speech recognition 142 may include data of name field and pronunciation string corresponding thereto only, or be composed by adding a pronunciation string field to the call history data or the text history data received from the mobile device 3. Alternatively, the contact history databases for speech recognition 142 may include only a portion of fields of the call history data or the text history data.

Although it has been for convenience of explanation described that operations of receiving the contact data from the mobile device 3 and producing the contact database for speech recognition are followed by operations of receiving the contact history data from the mobile device 3 and producing the contact history database for speech recognition, embodiments of the vehicle and the control method thereof according to the present disclosure are not limited thereto. Both the contact data and the contact history data may be received together, or the contact history data may be received first. Also, orders of data generation are not limited.

Furthermore, the storage 140 may store the contact data and the contact history data itself received from the mobile device 3, in addition to the databases for speech recognition 141 and 142.

Furthermore, the databases for speech recognition 141 and 142, the contact data and the contact history data may be stored for each mobile device 3. That is, the aforementioned data may be allocated and stored in an identifier such as a media access control (MAC) address, etc., configured for identifying the mobile device 3. In the instant case, when the same mobile device 3 is connected again later, all or a portion of processes of data download or data generation for speech recognition may be omitted.

Figure 10:
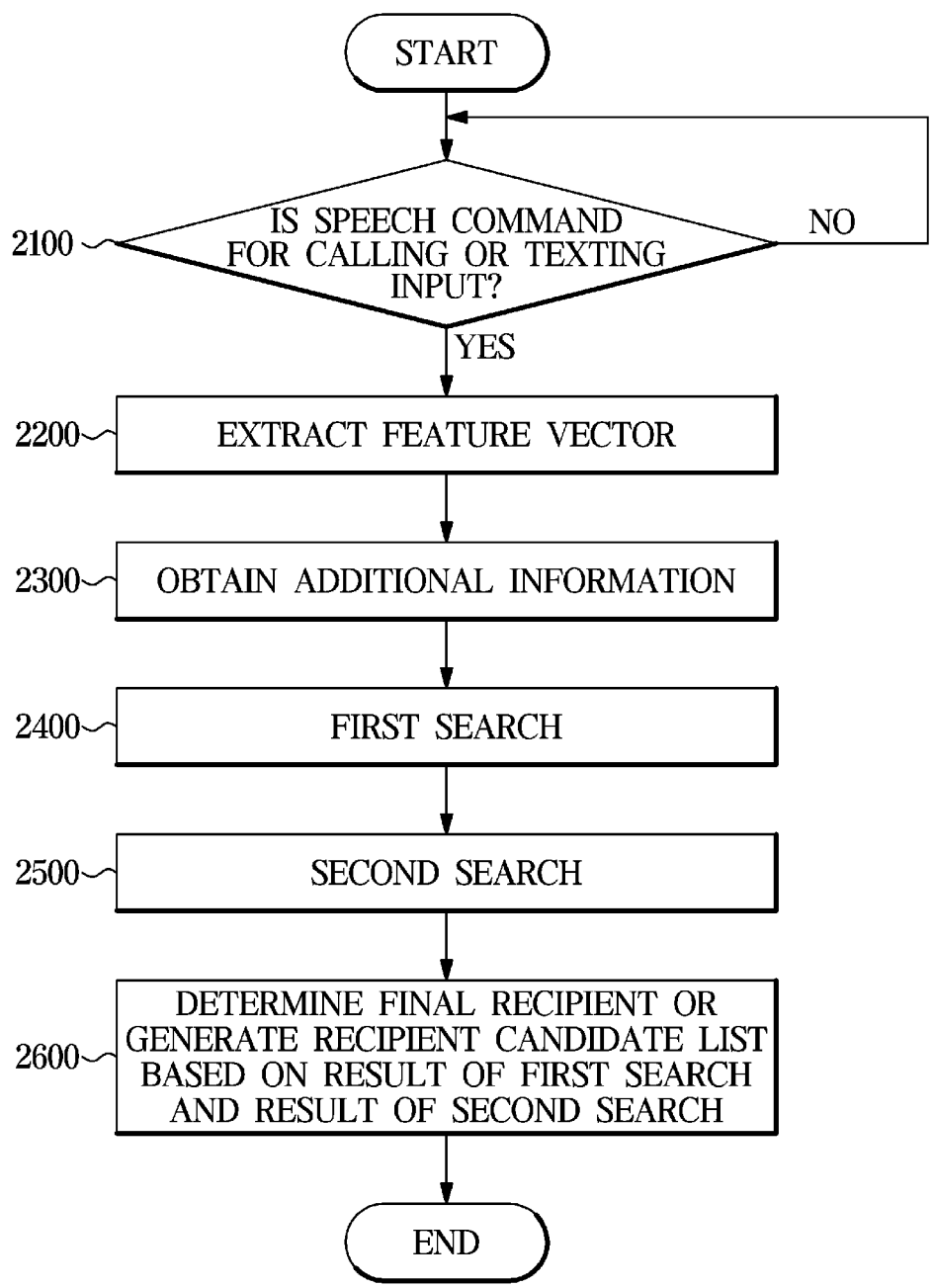
FIG. 10 is a flowchart illustrating operations of determining a recipient when a user's speech command is input, in a method of controlling a vehicle according to an exemplary embodiment of the present disclosure.

FIG. 10 is a flowchart illustrating operations of determining a recipient when a user's speech command is input, in a method of controlling a vehicle according to an exemplary embodiment of the present disclosure.

Referring to FIG. 10, when a speech command for calling or texting is input (Yes in operation 2100), the microphone 110 may output an audio signal corresponding to the input speech command and the speech recognition module 130 may detect a voice part from the audio signal and generate a voice signal.

The speech recognition module 130 may extract a feature vector from the voice signal (2200), and perform speech recognition by comparing the extracted feature vector with a previously stored pattern.

First, the speech recognition module 130 may obtain additional information related to a contact time from the voice signal (2300).

For example, when an input user speech command is "call Hong Gil-dong who I phoned yesterday", additional information of [call type: incoming/outgoing, time: yesterday] may be obtained. Alternatively, when an input user speech command is "call Hong Gil-dong whose call I missed this morning", additional information of [call type: missed, time: this morning] may be obtained. Alternatively, when an input user speech command is "call Hong Gil-dong who texted me today", additional information of [text type: incoming, time: today] may be obtained.

The speech recognition module 130 may perform a first search based on a result of obtaining the additional information (2400).

The first search includes searching a first speech recognition database for data corresponding to recipient information included in the voice signal. Here, the first speech recognition database includes a contact history database for speech recognition.

The speech recognition module 130 may search for a name corresponding to the recipient information included in the voice signal, by comparing the feature vector extracted from the voice signal with a pronunciation string stored in the first speech recognition database. In the present instance, data including a similarity greater than or equal to a reference value may be determined as data matching the recipient information.

When the additional information related to the contact time is obtained from the voice signal, the speech recognition module 130 may perform the first search based on the additional information related to the contact time. For example, when the additional information related to the contact time is 'today', a search scope may be limited to data whose contact time is 'today' in the first speech recognition database, and when the additional information related to the contact time is 'yesterday', a search scope may be limited to data whose contact time is 'yesterday' in the first speech recognition database.

When the additional information related to the contact time is not obtained, a search scope may be limited to data for a predetermined time period. For example, a search scope may be limited to data recorded within a predetermined time period from a current point in time in the first speech recognition database.

Alternatively, when contact data received from the mobile device 3 is data recorded within a predetermined time period from a current point in time, the first search may be performed in the entire first speech recognition database, without limiting a search scope.

The speech recognition module 130 performs a second search (2500).

The second search includes searching a second speech recognition database for data corresponding to recipient information included in the voice signal. Here, the second speech recognition database includes a contact database for speech recognition.

The speech recognition module 130 may search for a name corresponding to the recipient information included in the voice signal, by comparing the feature vector extracted from the voice signal with a pronunciation string stored in the second speech recognition database. In the present instance, data including a similarity greater than or equal to a reference value may be determined as data matching the recipient information.

The controller 160 may determine a final recipient or generate a recipient candidate list based on a result of the first search and a result of the second search (2600).

For example, when a single piece of data included in the result of the first search and the result of the second search exists, the controller 160 may determine the corresponding data as the final recipient. However, when two or more pieces of data included in both the result of the first search and the result of the second search exist, the controller 160 may generate the recipient candidate list including the two or more pieces of data.

Alternatively, when data included in both the result of the first search and the result of the second search does not exist, the controller 160 may generate the recipient candidate list including both the result of the first search and the result of the second search.

However, when the number of data included in the recipient candidate list exceeds a reference number N (N is an integer greater than or equal to 2), only the top N number of data based on a similarity may be included in the recipient candidate list.

When the final recipient is determined, the controller 160 may call or text a stored phone number assigned to the final recipient. When the recipient candidate list is generated, the controller 160 may output the recipient candidate list through the display 180 or the speaker 170.

According to the exemplary embodiment of the present disclosure, the final recipient may be determined by considering the contact history data as well as the contact data, and thus recent contacts may be prioritized and a likelihood of calling an unintended recipient may be reduced. Hereinafter, detailed examples are described.

Figure 11:
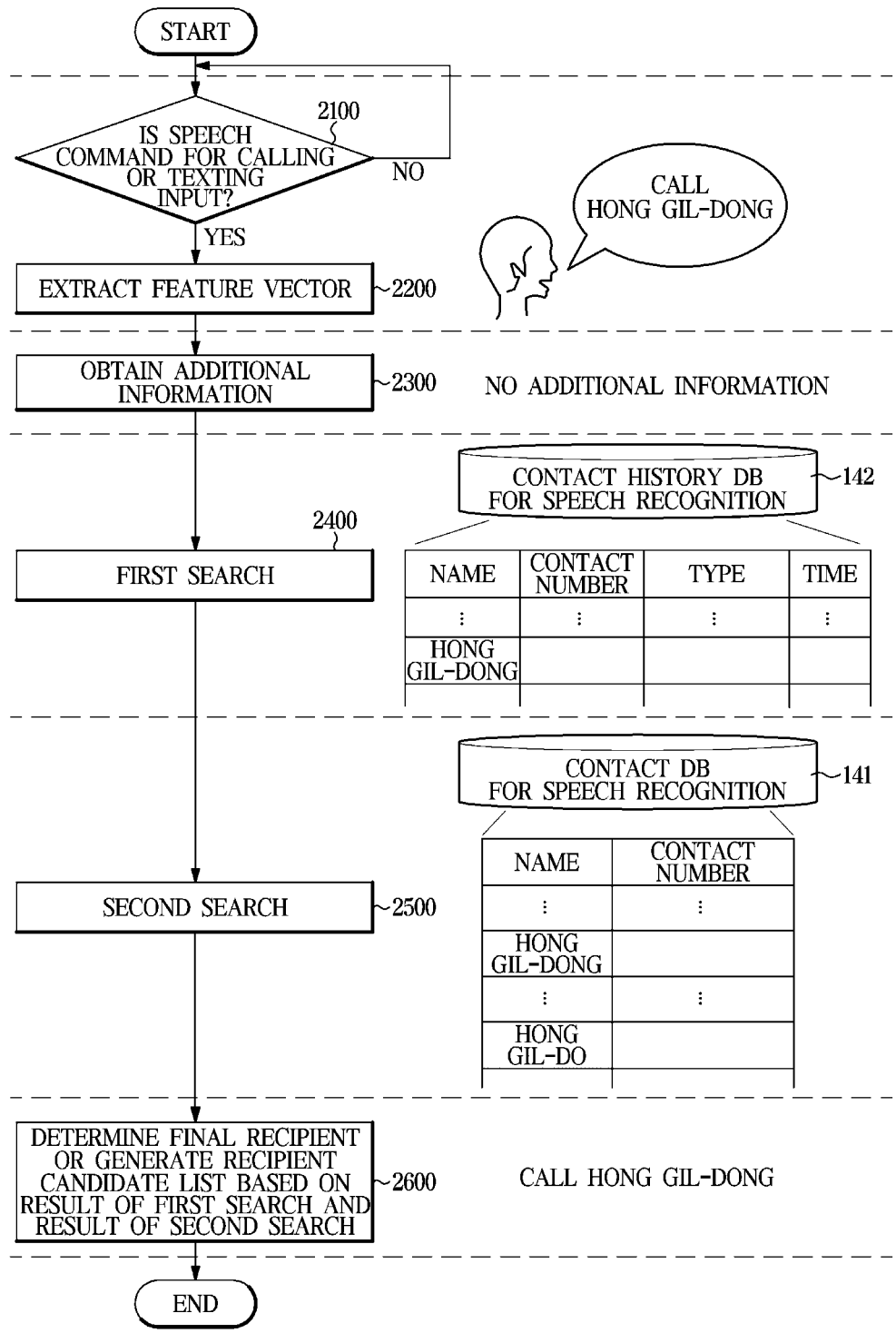
FIG. 11, FIG. 12 and FIG. 13 are diagrams illustrating examples of determining a recipient when a user's speech command is input, in a method of controlling a vehicle according to an exemplary embodiment of the present disclosure.
Figure 12:
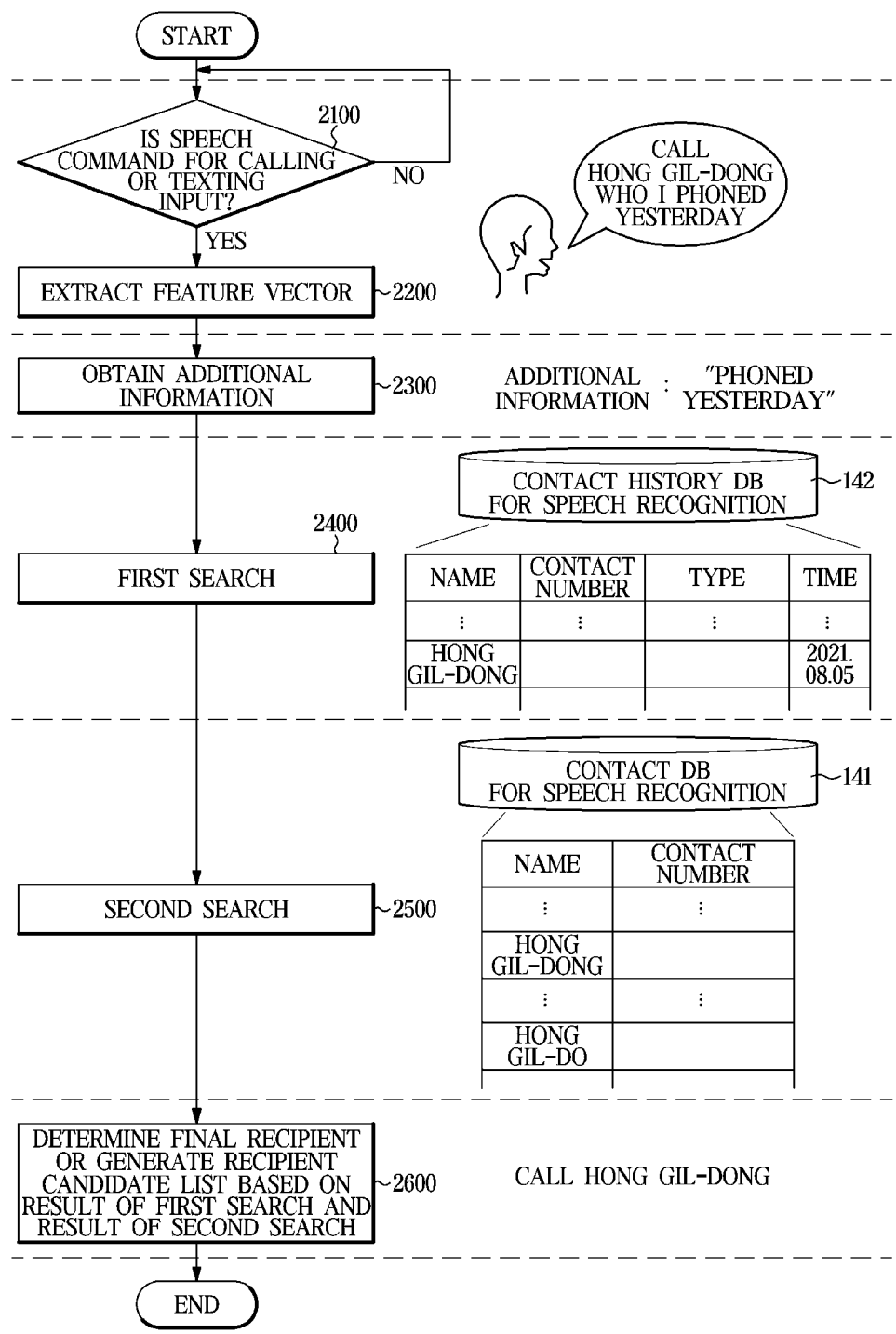
Figure 13:
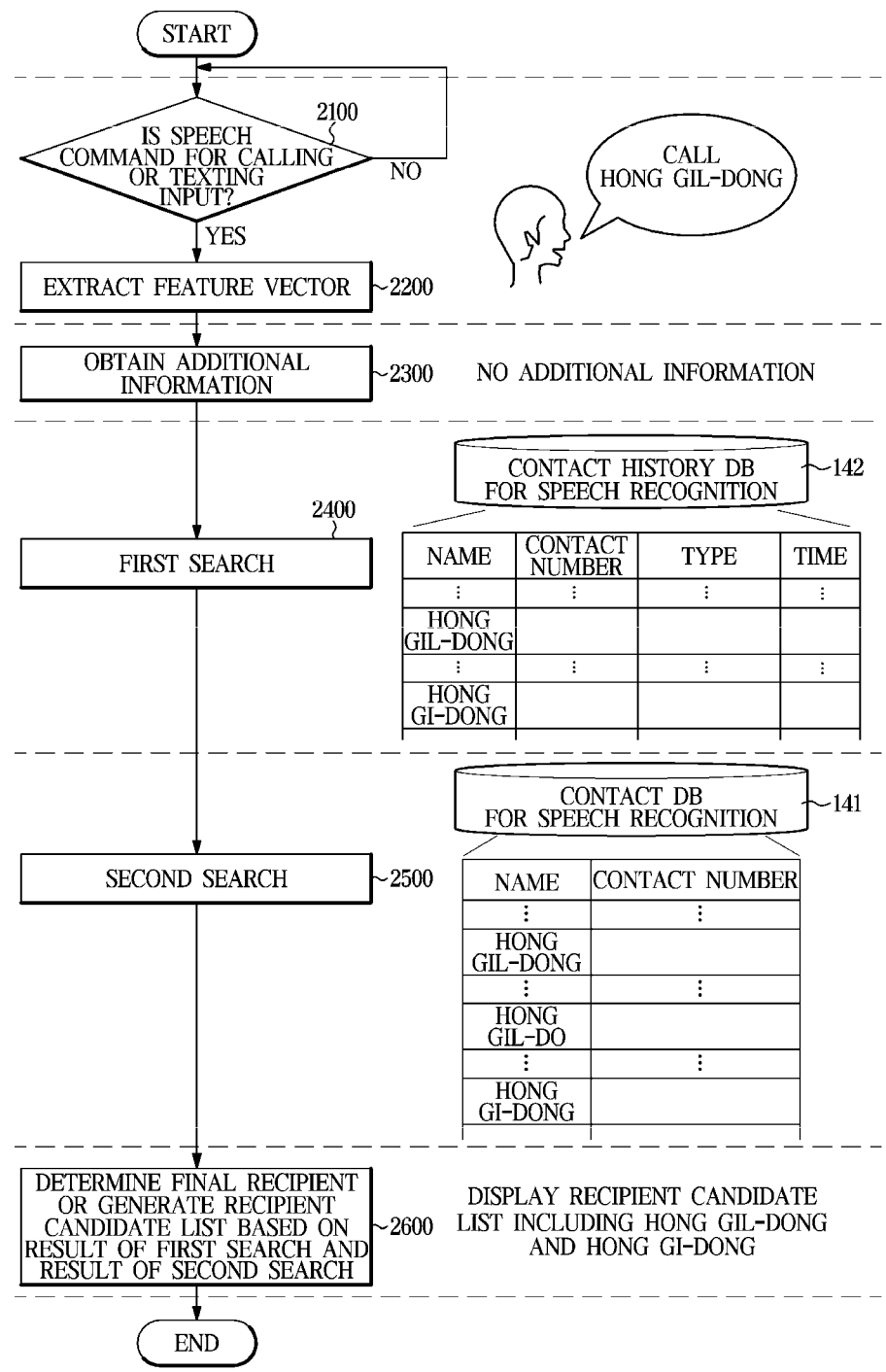

FIG. 11, FIG. 12 and FIG. 13 are diagrams illustrating examples of determining a recipient when a user's speech command is input, in a method of controlling a vehicle according to an exemplary embodiment of the present disclosure. FIG. 14 is a diagram illustrating an example of a recipient candidate list output by the example of FIG. 13.

Referring to FIG. 11, when a user inputs a speech command of "call Hong Gil-dong" to the microphone 110, the microphone 110 outputs an audio signal corresponding to the input speech command.

The audio signal output from the microphone 110 is input to the speech recognition module 130, and the speech recognition module 130 extracts a voice part from the audio signal.

The speech recognition module 130 extracts a feature vector from a voice signal corresponding to the voice part, and obtains additional information related to a contact time. In the example, no additional information included in the speech command exists.

The speech recognition module 130 performs a first search in a state where no additional information exists. That is, the speech recognition module 130 may search the contact history database for speech recognition 142 for data matching the feature vector extracted from the voice signal, i.e., data corresponding to recipient information included in the speech command.

In the example, "Hong Gil-dong" exists in the contact history database for speech recognition 142. That is, "Hong Gil-dong" exists among those who have recently talked on the phone or sent or received a text message. Accordingly, "Hong Gil-dong" may be searched for by the first search.

The speech recognition module 130 performs a second search. That is, the speech recognition module 130 may search the contact database for speech recognition 141 for data matching the feature vector extracted from the voice signal, i.e., data corresponding to recipient information included in the speech command.

In the example, "Hong Gil-dong" and "Hong Gil-do" exist in the contact database for speech recognition 141. A speech recognition performance may deteriorate due to noise occurring in a vehicle, etc., while the user inputs the speech command, or similar names may not be easily distinguished from each other. In the example, all the data including a similarity greater than or equal to a reference value as a result of comparison with the feature vector may be included in search results. Accordingly, both "Hong Gil-dong" and "Hong Gil-do" may be searched for by the second search.

"Hong Gil-dong" is included in a result of the first search, and "Hong Gil-dong" and "Hong Gil-do" are included in a result of the second search. That is, data included in the results of both the first and second searches is "Hong Gil-dong". Accordingly, the controller 160 may determine "Hong Gil-dong" as a final recipient, output a guide message notifying that a call will be made to "Hong Gil-dong" and call "Hong Gil-dong".

When searching the contact data only, without considering the contact history data, a call may be made to "Hong Gil-do" or a message for confirming whether to call "Hong Gil-dong" or "Hong Gil-do" may be output. However, by prioritizing a recent contact in consideration of the contact history data, a risk of calling an unintended recipient may be reduced without requiring a user's additional input.

Referring to FIG. 12, when a user inputs a speech command of "call Hong Gil-dong who I phoned yesterday" to the microphone 110, the microphone 110 outputs an audio signal corresponding to the input speech command.

The audio signal output from the microphone 110 is input to the speech recognition module 130, and the speech recognition module 130 extracts a voice part from the audio signal.

The speech recognition module 130 extracts a feature vector from a voice signal corresponding to the voice part, and obtains additional information related to a contact time. In the example, additional information of [contact type: call, contact time: yesterday] may be obtained.

The speech recognition module 130 performs a first search based on the additional information. The speech recognition module 130 may limit a search scope to those who have talked on the phone yesterday in the call history database for speech recognition 142a, and search for data corresponding to recipient information included in the speech command within the limited search scope.

In the example, "Hong Gil-dong" exists in the call history database for speech recognition 142a. That is, "Hong Gil-dong" exists among those who have talked on the phone yesterday. Accordingly, "Hong Gil-dong" may be searched for by the first search.

The speech recognition module 130 performs a second search. That is, the speech recognition module 130 may search the contact database for speech recognition 141 for data matching the feature vector extracted from the voice signal, i.e., data matching recipient information included in the speech command.

In the example, "Hong Gil-dong" and "Hong Gil-do" exist in the contact database for speech recognition 141. All the data including a similarity greater than or equal to a reference value as a result of comparison with the feature vector may be included in search results. Accordingly, both "Hong Gil-dong" and "Hong Gil-do" may be searched for by the second search.

"Hong Gil-dong" is included in a result of the first search and "Hong Gil-dong" and "Hong Gil-do" are included in a result of the second search. That is, data included in the results of both the first and second searches is "Hong Gil-dong". Accordingly, the controller 160 may determine "Hong Gil-dong" as a final recipient, output a guide message notifying that a call will be made to "Hong Gil-dong" and call "Hong Gil-dong".

Referring to FIG. 13, when a user inputs a speech command of "call Hong Gil-dong" to the microphone 110, the microphone 110 outputs an audio signal corresponding to the input speech command.

The audio signal output from the microphone 110 is input to the speech recognition module 130, and the speech recognition module 130 extracts a voice part from the audio signal.

The speech recognition module 130 extracts a feature vector from a voice signal corresponding to the voice part, and obtains additional information related to a contact time. In the example, no additional information included in the speech command exists.

The speech recognition module 130 performs a first search in a state where no additional information exists. In the example, "Hong Gil-dong" and "Hong Gi-dong" exist in the contact history database for speech recognition 142. That is, both "Hong Gil-dong" and "Hong Gi-dong" exist among those who have recently talked on the phone. Accordingly, both "Hong Gil-dong" and "Hong Gi-dong" may be searched for by the first search.

The speech recognition module 130 performs a second search. That is, the speech recognition module 130 may search the contact database for speech recognition 141 for data matching the feature vector extracted from the voice signal, i.e., data matching recipient information included in the speech command.

In the example, "Hong Gil-dong" as well as "Hong Gi-dong" and "Hong Gil-do" which are similar to "Hong Gil-dong" exist in the contact database for speech recognition 141. In the example, all the data including a similarity greater than or equal to a reference value as a result of comparison with the feature vector may be included in search results. Accordingly, all of "Hong Gil-dong", "Hong Gi-dong" and "Hong Gil-do" may be searched for by the second search.

"Hong Gil-dong" and "Hong Gi-dong" are included in a result of the first search, and "Hong Gi-dong", "Hong Gil-do" and "Hong Gil-dong" are included in a result of the second search. That is, data included in the results of both the first and second searches are "Hong Gil-dong" and "Hong Gi-dong". Accordingly, the controller 160 may generate a recipient candidate list including "Hong Gil-dong" and "Hong Gi-dong", without determining a final recipient.

The generated recipient candidate list may be displayed on the display 180 as shown in FIG. 14. Alternatively, the generated recipient candidate list may be audibly output through the speaker 170.

Alternatively, the recipient candidate list may be generated by including all the results of the first and second searches, depending on the total number of results of the first and second searches. For instance, in an example where the results of the first and second searches are displayed up to top three pieces of data based on a similarity, all of "Hong Gil-dong", "Hong Gi-dong" and "Hong Gil-do" may be included in the recipient candidate list.

Alternatively, even when two or more pieces of data included in the results of both the first and second searches exist, a score for each piece of data may be determined and the final recipient may be determined according to the determined score.

For example, a higher score may be provided, as the number of recent contacts increases. Also, a higher score may be provided, as the number of contacts made in a time period identical or similar to a current time increases.

In the example, even when both "Hong Gil-dong" and "Hong Gi-dong" exist in a recent contact history, when the user have recently called "Hong Gil-dong" more frequently, or when the user have called "Hong Gil-dong" more often in the same time period as the current time, "Hong Gil-dong" may be determined as a final recipient based on the score determined based on the above-described criterion.

As is apparent from the above, according to the exemplary embodiments of the present disclosure, the vehicle and the control method thereof can specify a recipient of a call or text through speech recognition on a user's speech, by considering call history data, text history data as well as contact data, preventing calling or texting an unintended recipient.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
 a microphone to which a speech command of a user is input;
 a communication module configured to receive contact data and contact history data from a mobile device;
 at least one memory configured to store a first speech recognition database, obtained based on the contact history data received from the mobile device, and a second speech recognition database obtained based on the contact data received from the mobile device; and at least one processor operatively connected to the microphone, the communication module and the at least one memory and configured to, when a speech command for calling or texting is input to the microphone, determine a final recipient or generate a recipient candidate list, based on recipient information included in the speech command, the stored first speech recognition database, and the stored second speech recognition database, wherein the at least one processor is configured to perform a first search of searching the first speech recognition database for data corresponding to the recipient information included in the speech command, and obtain additional information related to a contact time from the speech command of the user, and perform the first search based on the obtained additional information, wherein the additional information related to a contact time comprises at least one of information related to a date on which a call is made, and information related to a date and time at which a text message is received or transmitted.

2. The vehicle of claim 1, wherein the at least one processor is configured to
perform a second search of searching the second speech recognition database for data corresponding to the recipient information included in the speech command.

3. The vehicle of claim 2, wherein the at least one processor is configured to determine the final recipient or generate the recipient candidate list, based on a result of the first search and a result of the second search.

4. The vehicle of claim 2, wherein, when a single piece of data included in a result of the first search and a result of the second search exists, the at least one processor is configured to determine the single piece of data as the final recipient.

5. The vehicle of claim 2, wherein, when two or more pieces of data included in a result of the first search and a result of the second search exist, the at least one processor is configured to generate the recipient candidate list including the two or more pieces of data.

6. The vehicle of claim 2, wherein, when data included in a result of the first search and a result of the second search does not exist, the at least one processor is configured to generate the recipient candidate list including a result of the first search and a result of the second search.

7. The vehicle of claim 2, wherein the at least one processor is configured to limit an object of the first search to data recorded within a predetermined time period from a current point in time in the first speech recognition database.

8. The vehicle of claim 1, wherein the at least one processor is configured to call or text the determined final recipient.

9. The vehicle of claim 1, further including:
a display; and
a speaker,
wherein the at least one processor operatively connected to the display and the speaker is configured to output the generated recipient candidate list through the display or the speaker.

10. A method of controlling a vehicle, the method comprising:
receiving contact data and contact history data from a mobile device;
generating and storing a first speech recognition database based on the contact history data received from the mobile device;
generating and storing a second speech recognition database based on the contact data received from the mobile device; and
when a speech command for calling or texting is input to a microphone, determining, by at least one processor, a final recipient or generating, by the at least one processor, a recipient candidate list, based on recipient information included in the speech command, the stored first speech recognition database and the stored second speech recognition database,
wherein the determining of the final recipient or the generating of the recipient candidate list includes performing a first search of searching the first speech recognition database for data corresponding to the recipient information included in the speech command, and
wherein the determining of the final recipient or the generating of the recipient candidate list includes obtaining additional information related to a contact time from the speech command of a user, and performing the first search based on the obtained additional information, the additional information related to a contact time comprises at least one of information related to a date on which a call is made, and information related to a date and time at which a text message is received or transmitted.

11. The method of claim 10, wherein the determining of the final recipient or the generating of the recipient candidate list includes:
performing a second search of searching the second speech recognition database for data corresponding to the recipient information included in the speech command.

12. The method of claim 11, wherein the determining of the final recipient or the generating of the recipient candidate list includes determining the final recipient or generating the recipient candidate list, based on a result of the first search and a result of the second search.

13. The method of claim 11, wherein, when a single piece of data included in a result of the first search and a result of the second search exists, the determining of the final recipient or the generating of the recipient candidate list includes determining the single piece of data as the final recipient.

14. The method of claim 11, wherein, when two or more pieces of data included in a result of the first search and a result of the second search exist, the determining of the final recipient or the generating of the recipient candidate list includes generating the recipient candidate list including the two or more pieces of data.

15. The method of claim 11, wherein, when data included in a result of the first search and a result of the second search does not exist, the determining of the final recipient or the generating of the recipient candidate list includes generating the recipient candidate list including the result of the first search and the result of the second search.

16. The method of claim 11, wherein an object of the first search is limited to data recorded within a predetermined time period from a current point in time in the first speech recognition database.

17. The method of claim 10, further including calling or texting, by the at least one processor, the determined final recipient.

18. The method of claim 10, further including outputting, by the at least one processor operatively connected to a display or a speaker, the generated recipient candidate list through the display or the speaker provided in the vehicle.

\* \* \* \* \*